(12) United States Patent
Miao

(10) Patent No.: US 7,966,651 B2
(45) Date of Patent: Jun. 21, 2011

(54) METHOD FOR REALIZING THE NETWORK SECURITY BY SEGMENTING THE TTL

(75) Inventor: Fuyou Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 647 days.

(21) Appl. No.: 12/051,206

(22) Filed: Mar. 19, 2008

(65) Prior Publication Data

US 2008/0189765 A1     Aug. 7, 2008

Related U.S. Application Data

(63) Continuation of application No. PCT/CN2006/001038, filed on May 19, 2006.

(30) Foreign Application Priority Data

Sep. 23, 2005 (CN) .......................... 2005 1 0105507

(51) Int. Cl.
   *G06F 7/04* (2006.01)
   *G06F 9/00* (2006.01)
   *G06F 15/173* (2006.01)
(52) U.S. Cl. .................. 726/3; 726/11; 726/13; 726/14; 726/22; 726/23; 709/223; 709/224
(58) Field of Classification Search .............. 726/11–14, 726/22–23; 370/229–238.1; 709/223–226
See application file for complete search history.

(56) References Cited

U.S. PATENT DOCUMENTS

| 6,104,695 | A | 8/2000 | Wesley et al. |
| 6,760,309 | B1 | 7/2004 | Rochberger et al. |
| 6,985,476 | B1* | 1/2006 | Elliott et al. ................... 370/349 |
| 2003/0110274 | A1* | 6/2003 | Pazi et al. ...................... 709/229 |
| 2004/0252693 | A1* | 12/2004 | Cheriton et al. ........... 370/395.1 |
| 2005/0058129 | A1* | 3/2005 | Jones et al. .................... 370/389 |

FOREIGN PATENT DOCUMENTS

| CN | 1472937 A | 2/2004 |
| CN | 100563172 C | 11/2009 |
| WO | WO 2004/112333 A1 | 12/2004 |

OTHER PUBLICATIONS

Agarwal, P. et al. "RFC 3443—Time to Live (TTL) Processing in Multi-Protocol Label Switching (MPLS) Networks," Network Working Group, Cisco Systems, Jan. 2003.*

(Continued)

*Primary Examiner* — Hosuk Song
*Assistant Examiner* — Darren B Schwartz
(74) *Attorney, Agent, or Firm* — Leydig, Voit & Mayer, Ltd.

(57) ABSTRACT

A method for realizing the network security by segmenting the TTL (time to live), includes: assigning the different TTL segments to the wholesale service provider network, the lower service provider network and the user network in the service provider network-building; realizing the TTL Partition Security Mechanism (TPSM) in the wholesale service provider network and the lower service provider network simultaneously using the assigned TTL segments. And a system for realizing the network security by segmenting the TTL is provided, in the condition of the service provider CsC network-building, TPSM is realized simultaneously in the wholesale service provider network and the lower service provider network.

20 Claims, 5 Drawing Sheets

OTHER PUBLICATIONS

Gill, V. et al. "RFC 3682—The Generalized TTL Security Mechanism (GTSM)," Network Working Group, Feb. 2004.*
Miao Fuyou; "TTL Partition Security Mechanism ;draft-maio-ttl-partition-00.txt"; Memo; dated Jul. 5, 2005.
1st Office Action in corresponding Chinese Application No. 200680012299.6 (Dec. 26, 2008).
1st Office Action in corresponding Chinese Application No. 200510105507.4 (Jan. 9, 2009).
Written Opinion of the International Searching Authority in corresponding PCT Application No. PCT/CN2006/001038 (Sep. 7, 2006).
Gill et al., "RFC3682—The Generalized TTL Security Mechanism (GTSM)," Feb. 2004, The Internet Society, Reston, Virginia.

* cited by examiner

METHOD FOR REALIZING THE NETWORK SECURITY BY SEGMENTING THE TTL

CROSS-REFERENCE TO RELATED APPLICATIONS

This application is a continuation of International Patent Application No. PCT/CN2006/001038, filed May 19, 2006, which claims priority to Chinese Patent Application No. 200510105507.4, filed Sep. 23, 2005, both of which are hereby incorporated by reference.

FIELD OF THE INVENTION

The present invention relates to the field of network communications, and in particular, to a method and a system for realizing network security protection by TTL (Time to Live) partition.

BACKGROUND OF THE INVENTION

Due to the existence of a forwarding loop in an IP network, a message may be forwarded endlessly in the loop, and a lot of resources may be consumed. In view of this, a TTL field is set in an IPv4 (Internet Protocol Version 4) header, and a Hop Limit field is set in an IPv6 header. Lengths, functions and processing of the two fields are totally identical. A processing procedure will be described taking the TTL field as an example.

When a host creates an IPv4 message, an initial value, which is a numerical value between 0 and 255, is allocated to the TTL field of the message. In the Linux (an operating system), the initial value is 64 by default, and in the Windows (an operating system from the Microsoft Corporation), the initial value is 128 by default. When a router receives such an IPv4 message described above, it checks the value of the TTL field prior to forwarding the message. If the value of the TTL field is zero, the message is discarded. If the value of the TTL field is not zero, the value of the TTL field of the message is decreased by one, and then the message is forwarded. Thus, if the forwarding loop exists in a network, the message will discarded in the loop when the TTL is decreased to zero, so that the message would not be forwarded endlessly in the loop.

The security of a network or a network node can be protected effectively using the above characteristics of the TTL.

In the prior art, there is provided a method for realizing backbone network security protection using TTL partition, i.e., a TPSM (TTL Partition Security Mechanism) method.

A basic assumption of the TPSM is that a backbone network device needs not to interact directly with a user, but only forwards a message from the user without processing through any protocol above the IP layer. If the message comes from the user, and the message is destined for the backbone network device, the backbone network device can directly discard the message.

The TPSM divides a network into a carrier network and a customer network, where the carrier network is consisted of a P (P Router, a core router of a carrier) device and a PE (Provider Edge, an edge router of the carrier network) device. The PE is connected either directly to the customer network (such as an enterprise network) or via a Layer-2 network to the customer network or a customer host, such as an ADSL (Asymmetric Digital Subscriber Loop), and the P device is a backbone of the carrier network, and responsible for connecting PE routers.

A TrustRadius can be defined for a device, which refers to a maximum number of hops from another device trusted by that device. The TPSM divides the TTL into a high segment and a low segment, where the high segment ranging from 255 to 255-TrustRadius is allocated to the backbone network of the carrier, and a TTL of a message communicated between the PE device and the P device of the backbone network can only be within this range, and an initial value for the TTL of a message communicated in the backbone network is set as 255. If a P or PE router finds that the TTL of a message destined for the P or PE router is less than 255-TrustRadius, this message is regarded as being from a customer network, and is discarded directly; if the TTL of the message is greater than 255-TrustRadius, a corresponding processing can be performed.

Since the TTL of a message from a customer network can be greater than 255-TrustRadius, the P router of the backbone network may wrongly receive this message. To avoid this situation, at the edge of the backbone network, i.e. on the PE device, the TTL of a message of the backbone network can be decreased to a value less than 255-trustRadius, i.e. a maximum TTL_USER_MAX for the TTL of a message of the customer network. This value is typically greater than 128, so that the effect on the network due to the above situation can be decreased to a relatively low level.

In the prior art, the TPSM divides a network into a customer network and a carrier network, treating the carrier network as a whole. Actually, networks for serving a customer may involve numerous carrier networks between which there are various relationships. Particularly, a carrier network may provide another carrier network with a backbone network connection, in which case the latter carrier network is a carrier for its customers, while it is a customer of the carrier network which provides it with a backbone network connection. This is generally referred to as a CsC (Carrier's Carrier), and in the CsC, a carrier providing a VPN (Virtual Private Network) service is referred to as a wholesale carrier, and a carrier that uses a wholesale service is referred to as a subordinate carrier.

The above TPSM can be implemented individually in a wholesale carrier network A without any adverse effect on the network.

However, if the TPSM is implemented individually in a subordinate carrier, for example, in a subordinate carrier network B, then the network B shall determine whether to take the wholesale carrier network A as a customer network or merely as a P device. If the A is taken as a customer network, the TPSM can only be implemented individually in each site within the network B. As a result, devices at different sites within network B cannot communicate directly, which would be not acceptable. If the A is taken as a P device, then for a P device within the network A, the same message TTL processing rule(s) shall be enforced as for a P device within the network B, which in fact would be impossible, since a wholesale carrier network may provide several subordinate carriers with wholesale services at the same time, and some of the subordinate carriers may have already realized the TPSM while others have not. Parameters may not be totally the same even if the TPSM has been realized in all of the subordinate carriers.

In the prior art, there is no effective solution to implement the TPSM simultaneously in both a wholesale carrier network and a subordinate carrier network.

SUMMARY OF THE INVENTION

One embodiment of the invention provides a method for realizing network security protection by TTL (Time to Live) partition, including:

A) allocating different TTL segments to a wholesale carrier network, a subordinate carrier network and a customer network in CsC (Carrier's Carrier) networking;

B) realizing a TPSM (TTL Partition Security Mechanism) simultaneously in the wholesale carrier network and the subordinate carrier network using the allocated TTL segments.

Another embodiment of the invention provides a system for realizing network security protection by TTL (Time to Live) partition, including:

a TTL segment allocating device, for allocating different TTL segments to a wholesale carrier network, a subordinate carrier network and a customer network in CsC (Carrier's Carrier) networking;

a security mechanism control device, connected with the TTL segment allocating device, for realizing a TPSM (TTL Partition Security Mechanism) simultaneously in the wholesale carrier network and the subordinate carrier network using the allocated TTL segments.

It can be seen from the above that in the case of the CsC networking, different TPSM parameters can be set according to different requirements of the actual networking by improving an existing TPSM solution, so that the TPSM can be implemented simultaneously in the wholesale carrier network and the subordinate carrier network, and thus a security protection mechanism can be provided simultaneously for the wholesale carrier network and the subordinate carrier network.

DETAILED DESCRIPTION OF THE INVENTION

Figure 1:
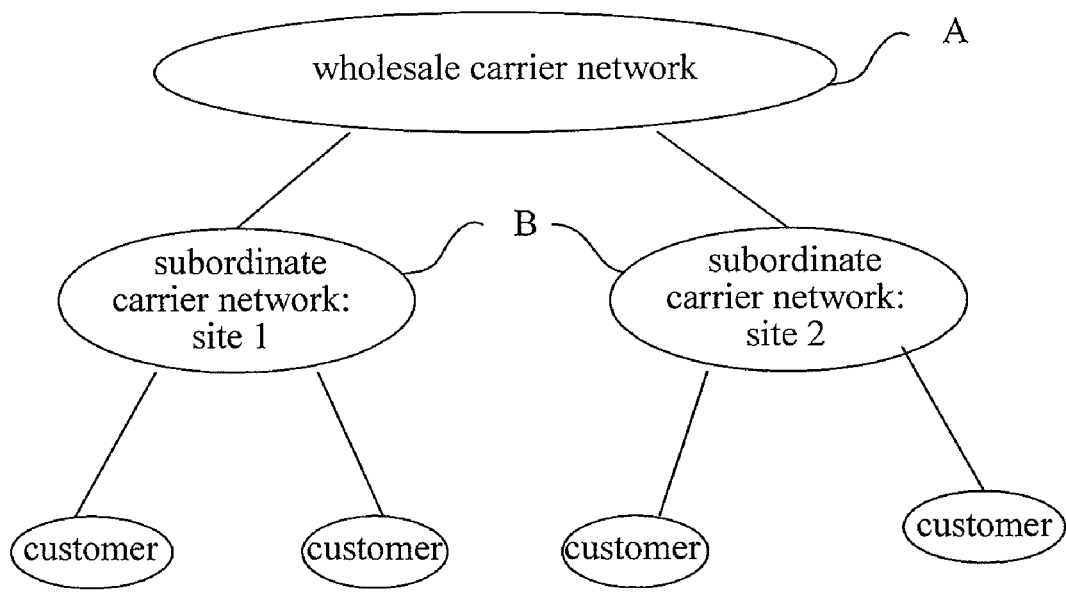
FIG. 1 is a schematic diagram of networking for a CsC.

One embodiment of the invention is applicable in CsC networking as illustrated as in FIG. 1, different TTL segments are allocated to a wholesale carrier network, a subordinate carrier network and a customer network in a CsS according to different requirements of the actual networking, so that a TPSM can be implemented simultaneously in the wholesale carrier network and the subordinate carrier network.

For those skilled in the art to better understand technical solutions according to the invention, the invention will be described in detail in conjunction with the drawings and the embodiments thereof.

Figure 2:
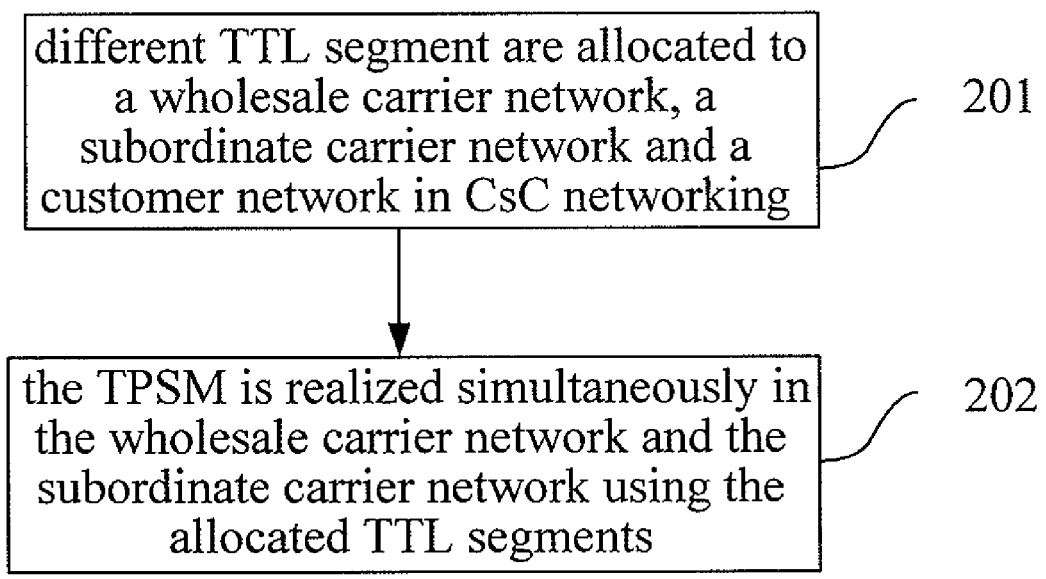
FIG. 2 is a flow chart of a method according to one embodiment of the invention.

Referring to FIG. 2, it illustrates a flow chart of a method according to one embodiment of the invention, which includes the steps of:

Step 201: different TTL segments are allocated to a wholesale carrier network, a subordinate carrier network and a customer network in CsC networking.

It is well known to those skilled in the art that the CsC can have various requirements, mainly including the following two situations.

The subordinate carrier may receive a message sent from a device in the wholesale carrier network, for example, a routing update message, or does not receive such a message, for example, the message itself may be regarded as a potential security attack. In one embodiment of the invention, different TTL segments can be allocated, according to different situations of the actual CsC networking, to a wholesale carrier network, a subordinate carrier network and a customer network therein. The subordinate carrier network uses a TTL segment lower than that of the wholesale carrier network, which can include the TTL segment used by the wholesale carrier network, but cannot be partially intersected with the TTL segment used by the wholesale carrier network, which will be described in detail hereinafter.

Step 202: the TPSM is realized simultaneously in the wholesale carrier network and the subordinate carrier network using the allocated TTL segments.

For a node in the wholesale carrier network, when the node sends a message, the message is allocated with an appropriate initial value of the TTL (for example, 255). Similarly, for a node in the subordinate carrier network, when the node sends a message, the message is allocated with an appropriate initial value of the TTL (for example, 255). A specific value can be set according to different node locations and networking requirements.

A PE of the wholesale carrier network checks each message entering that network. Upon receipt of a message not destined for the PE, the PE checks the TTL of the message. If the TTL is greater than an allowable minimum for a TTL of the wholesale carrier network, the TTL of the message is decreased to an allowable maximum for a TTL of the subordinate carrier network, and the message is forwarded. If the TTL is less than or equal to the allowable minimum of a TTL of the wholesale carrier network, the message is forwarded normally.

When a device of the wholesale carrier network receives a message not destined for the device, if the TTL of the message is less than or equal to the allowable minimum for a TTL of the wholesale carrier network, the message is discarded; if the TTL of the message is greater than the allowable minimum for a TTL of the wholesale carrier network, the message is delivered to an upper-layer protocol for processing.

A PE of the subordinate carrier network checks each message entering that network. Upon receipt of a message not destined for the PE connected to the user, the PE network checks the TTL of the message. If the TTL is greater than an allowable minimum for a TTL of the subordinate carrier network, the TTL of the message is decreased to an allowable maximum for a TTL of the customer network, and the message is forwarded. If the TTL is less than or equal to the allowable minimum of a TTL of the subordinate carrier network, the message is forwarded normally.

As discussed previously, there are mainly two different situations for the CsC according to actual networking requirements. Procedures for implementation one embodiment of the invention in the two different situations will be described in detail respectively.

For the first situation, the subordinate carrier receives a message sent from a device in the wholesale carrier network, for example, a routing update message.

Figure 3:
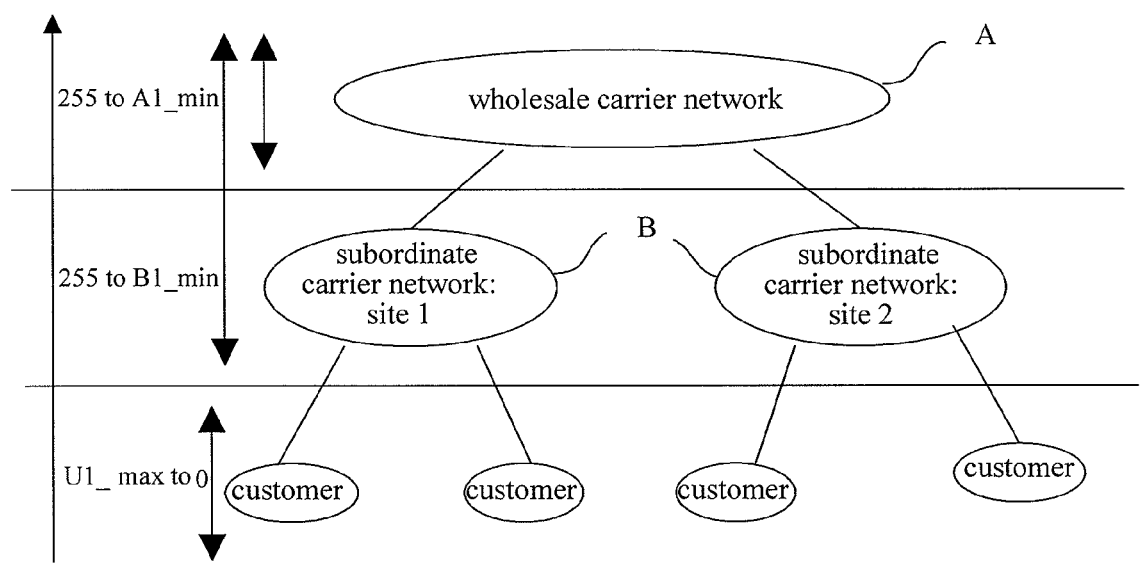
FIG. 3 is a schematic diagram illustrating TTL fields allocated to networks at different levels in a CsC in a method according to one embodiment of the invention.

In this situation, a schematic diagram of setting TPSM parameters in a wholesale carrier network, a subordinate carrier network and a customer network is illustrated in FIG. 3.

As illustrated in FIG. 3, one embodiment of the invention divides a TTL ranging from 255 to A1_min into a plurality of segments, where A1_min is an allowable minimum for a TTL of the carrier A. A larger TTL segment used by the wholesale carrier ranges from 255 to B1_min, where B1_min is an allowable minimum for a TTL of the carrier B, and less than A1_min, and thus this TTL segment contains the TTL segment used by the wholesale carrier. The TTL segment used by the customer network ranges from U1_max to 0, where U1_max is an allowable maximum for a TTL of the customer network, and is less than B1_min.

In this situation, a TPSM processing procedure in the wholesale carrier network A and the subordinate carrier network B is as following.

For the wholesale carrier network A, the TPSM can be realized as specified in an existing TPSM, particularly as following.

A PE (Provider Edge) of the network A checks each message entering the network A. If the PE checks that the message is not destined for the PE, and the TTL of the message is greater than A1_min, i.e., 255-TrustRadius as specified in the TPSM, the TTL of the message is decreased to B1_max (for the network A, B1_max is TTL_USER_MAX in a basic solution of the TPSM), and the message is forwarded normally. If the TTL of the message is less than or equal to A1_min, the message is forwarded normally.

An initial value for the TTL of the message sent by a device in the network A is set as 255.

If a device in the network A (including a PE in the network A) receives a message not destined for the device, and the TTL is less than or equal to A1_min, the message is discarded directly. If the TTL is greater than A1_min, according to a security strategy, the TTL of a message and TPSM parameters for the network A determined in advance, the message is delivered to an upper-layer protocol for processing.

For the subordinate carrier network B, a TPSM processing procedure is as following.

A PE of the network B checks each message entering the network B. When a PE connected to a customer network checks that the message is not destined for the PE, and the TTL of the message is greater than B1_min, the TTL of the message is decreased to U1_max, and the message is forwarded normally. If the TTL of the message is less than or equal to B1_min, the message is forwarded normally. When a PE connected to the network A checks that a message from the network A is not destined for the PE, the message is forwarded directly in a normal way.

An initial value for the TTL of a message sent by a device in the network B is also set as 255. Thus, when a device in network B receives a message of which the TTL is greater than A1_min, the message cannot be determined whether to be from the network A or B. However, according to a predetermined strategy (for example, if the network B receives the message from the network A, then it can be known that the message is from the network A), the message can be forward normally or be delivered to an upper-layer protocol for processing.

If a device in the network B (including a PE in the network B) receives a message not destined for the device, and the TTL is less than or equal to B1_min, the message is regarded as being from the customer network, and the message is discarded directly. If the TTL is greater than B1_min, according to a security strategy, the TTL of a message and TPSM parameters for the network B determined in advance, the message is delivered to an upper-layer protocol for processing.

The processing procedure of the inventive method in the first situation is simple to implement, and is applicable to most applications, and it is of little difference from a basic TPSM, where for the network B, B1_min is 255-TrustRadius in the TPSM.

For the second situation, the subordinate carrier does not receive the message sent from a device in the wholesale carrier network. For example, such a message is regarded as a potential security attack.

Figure 4:
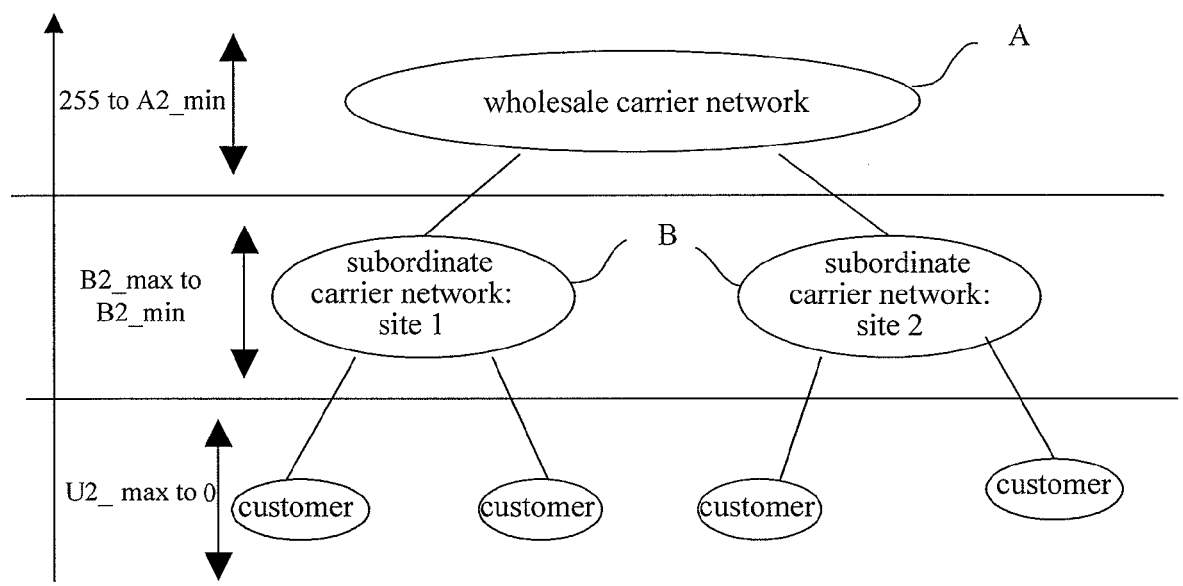
FIG. 4 is a schematic diagram illustrating TTL fields allocated to networks at different levels in a CsC in a method according to one embodiment of the invention.

In this situation, a schematic diagram of setting TPSM parameters in a wholesale carrier network, a subordinate carrier network and a customer network is illustrated in FIG. 4.

For this situation, one embodiment of the invention also divides a TTL into a plurality of segments. A larger TTL segment used by the wholesale carrier ranges from 255 to A2_min, where A2_min is an allowable minimum for a TTL of the carrier A, and a shorter TTL segment used by the subordinate carrier ranges from B2_max to A2_min, where B2_max is an allowable maximum for a TTL of the carrier B, B2_min is an allowable minimum for a TTL of the carrier B, and B2_max is less than A2_min. A lowest TTL segment used by the customer network ranges from U2_max to 0, where U2_max is an allowable maximum for a TTL of the customer network, and is less than B2_min.

According to the above configuration of TPSM parameters, there is no overlap between either two of the TTL segment used by the wholesale carrier, that used by the subordinate carrier and that used by the customer network.

In this situation, a TPSM processing procedure in the wholesale carrier network A and the subordinate carrier network B is as following.

For the wholesale carrier network A, the TPSM processing procedure is as following.

A PE of the network A checks each message entering the network A. If the PE checks a message not destined for the PE, and the TTL of the message is greater than A2_min, i.e., 255-TrustRadius as specified in the TPSM, the TTL of the message is decreased to B2_max (for the network A, B2_max is TTL_USER_MAX in a basic solution for the TPSM), and the message is forwarded normally. If the TTL of the message is less than or equal to A2_min, the message is forwarded normally.

An initial value for the TTL of a message sent by a device in the network A is set as 255.

If a device in network A (including a PE in the network A) receives a message not destined for the device, and the TTL is not greater than A2_min, the message is discarded directly. If the TTL is greater than or equal to A2_min, according to a security strategy, the TTL of a message and TPSM parameters for the network A determined in advance, the message is delivered to an upper-layer protocol for processing.

For the subordinate carrier network B, a TPSM processing procedure is as follows:

An edge router PE of the network B checks each message entering the network B. When a PE connected to a customer network checks that a message from the customer network is not destined for the PE, and the TTL of the message is greater than B2_min, the TTL of the message is decreased to U2_max, and the message is forwarded normally. If the TTL of the message is less than or equal to B2_min, then the message is forwarded normally. When a PE connected to the network A checks that a message from the network A is not destined for the PE, and the TTL of the message is greater than B2_max, the message is discarded directly. If the TTL of the message is less than or equal to B2_max, then the message is forwarded normally.

An initial value for the TTL of a message sent by a device in the network B is set as B_max. If a device in the network B (including a PE in the network B) receives a message not destined for the device, and the TTL is less than or equal to B2_min, the message is regarded as being from the customer network and is discarded directly. If the TTL is greater than B2_min, then according to a predetermined security strategy, the TTL of a message and TPSM parameters for the network B determined in advance, the message is delivered to an upper-layer protocol for processing.

In the above first and second situations, a complexity of the network A shall be considered for selection of B_max and B_min, since a TTL typically decreases during transmission of a message from a site of the network B to another site of the network B via the network A. Therefore, it is specified theoretically that B_max−B_min>TrustRadius of the network A plus a sum of TrustRadiuses of those two sites in the network B whose TrustRadiuses are the largest.

The method one embodiment of according to the invention is applicable to an IPv4 or IPv6 network.

Figure 5:
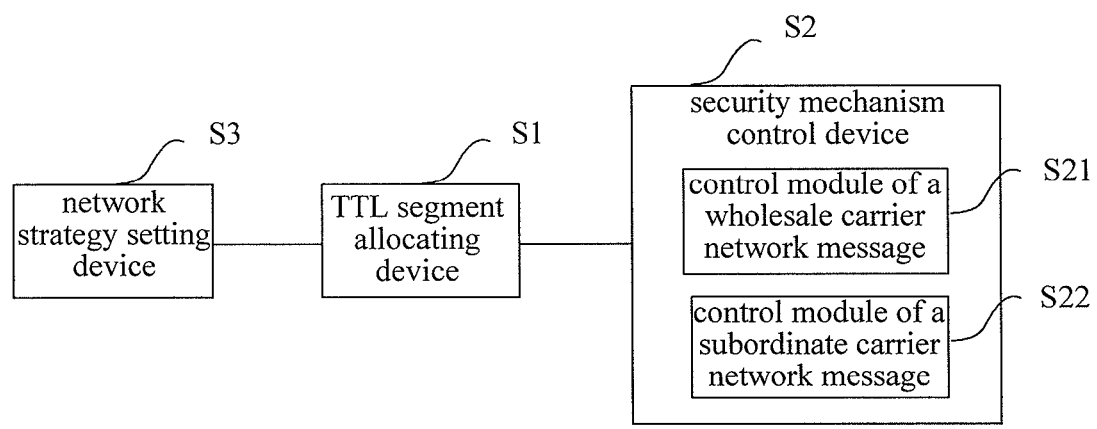
FIG. 5 is a block diagram illustrating the principle of a system according to one embodiment of the invention.

In order to implement a TPSM simultaneously in a wholesale carrier network and a subordinate carrier network in the case of CsC networking, one embodiment of the invention provides a system for realizing network security protection by TTL partition, a principle block diagram of which is illustrated in FIG. 5.

The system includes a TTL segment allocating device S1 and a security mechanism control device S2.

Particularly, the TTL segment allocating device S1 is used to allocate in CsC networking different TTL segments to a wholesale carrier network, a subordinate carrier network and a customer network, and the security mechanism control device S2, connected with the TTL segment allocating device and further with the wholesale carrier network and the subordinate carrier network, is used to realize the TPSM simultaneously in the wholesale carrier network and the subordinate carrier network using the allocated TTL segments.

It is well known to those skilled in the art that in the CsC networking, the subordinate carrier network may or may not receive a message sent by a device in the wholesale carrier network dependent upon a practical application requirement. Therefore, for facilitating the use of the inventive system, the system can further include a network strategy setting device S3, connected with the TTL segment allocating device S1, for setting a message receiving strategy of the subordinate carrier network. Thus, the TTL segment allocating device S1 can flexibly allocate TTL segments used by various levels of networks according to different application requirements of the CsC networking.

In a specific application, TTL segments can be set as following.

If a message receiving strategy of the subordinate carrier network set by the network strategy setting device is that a message sent by a device in the wholesale carrier network is received, the TTL segment allocating device allocates TTL segments in the following ways.

A range of a TTL allocated to the wholesale carrier network is $A1\_min \leq TTL \leq 255$, where $A1\_min$ is an allowable minimum for a TTL of the wholesale carrier network.

A range of a TTL allocated to the subordinate carrier network is $B1\_min \leq TTL \leq 255$, where $B1\_min$ is an allowable minimum for a TTL of the subordinate carrier network, and is less than $A1\_min$.

A range of a TTL allocated to the customer network is $0 < TTL \leq U1\_max$, where $U1\_max$ is an allowable maximum for a TTL of the customer network, and is less than $B1\_min$.

If the message receiving strategy of the subordinate carrier network set by the network strategy setting device is that the message sent by a device in the wholesale carrier network is not received, the TTL segment allocating device allocates TTL segments in the following ways.

A range of a TTL allocated to the wholesale carrier network is $A2\_min \leq TTL \leq 255$, where $A2\_min$ is an allowable minimum for a TTL of the wholesale carrier network.

A range of a TTL allocated to the subordinate carrier network is $B2\_min \leq TTL \leq B2\_max$, where $B2\_max$ is an allowable maximum for a TTL of the subordinate carrier network, $B2\_min$ is an allowable minimum for a TTL of the subordinate carrier network, and is less than $A2\_min$.

A range of a TTL allocated to the customer network is $0 < TTL \leq U2\_max$, where $U2\_max$ is an allowable maximum for a TTL of the customer network, and is less than $B2\_min$.

For a convenient control over various levels of networks to realize a TPSM, a control module of a wholesale carrier network message S21 and a control module of a subordinate carrier network message S22 can be provided in the security mechanism control device. Particularly, the control module of a wholesale carrier network message S21 can be provided in an edge router of the wholesale carrier network, so that according to a TTL segment allocated to the wholesale carrier network by the TTL segment allocating device, the edge router can be controlled to forward a received message. Similarly, the control module of a subordinate carrier network message S22 can be provided in an edge router of the subordinate carrier network, so that according to a TTL segment allocated to the subordinate carrier network by the TTL segment allocating device, the edge router can be controlled to forward a received message.

In a different application, procedures in which the control module of a wholesale carrier network message S21 and the control module of a subordinate carrier network message S22 forward a message of an edge router, where the control modules are located, have been described in detail with the reference to the inventive method, and therefore will not be described again here.

The present invention has been described and illustrated with reference to the embodiments thereof and the drawings. It shall be obvious to those skilled in the art that those embodiments and drawings are merely illustrative and not restrictive, that the present invention shall not be limited the embodiments disclosed here, and that various modifications and variations can be made thereto in light of the descriptions and the drawings without departing from the spirit and scope of the present invention as defined in the accompanying claims.

What is claimed is:

1. A method for realizing network security protection by TTL (Time to Live) partition, comprising:
   A) allocating different TTL segments to a wholesale carrier network, a subordinate carrier network and a customer network in CsC (Carrier's Carrier) networking;
   B) realizing a TPSM (TTL Partition Security Mechanism) simultaneously in the wholesale carrier network and the subordinate carrier network using the allocated TTL segments; and
   wherein when the subordinate carrier network accepts a message sent from a device in the wholesale carrier network, step A further comprises:
      a range of a TTL allocated to the wholesale carrier network is $A1\_min \leq TTL \leq 255$, where $A1\_min$ is an allowable minimum for a TTL of the wholesale carrier network;
      a range of a TTL allocated to the subordinate carrier network is $B1\_min \leq TTL \leq 255$, where $B1\_min$ is an allowable minimum for a TTL of the subordinate carrier network, and is less than $A1\_min$; and a range of a TTL allocated to the customer network is $0<TTL\leq U1\_max$, where $U1\_max$ is an allowable maximum for a TTL of the customer network, and is less than $B1\_min$.

2. The method for realizing network security protection by TTL partition according to claim 1, wherein the step B comprises:

an provider edge (PE) router of the wholesale carrier network checking each message entering the wholesale carrier network, and when the PE router receives a message not destined for the PE router, if a TTL of the message is greater than $A1\_min$, decreasing the TTL of the message to $B1\_max$ and forwarding the message;

when a device in the wholesale carrier network receives a message destined for the device, if a TTL of the message is less than or equal to $A1\_min$, discarding the message; if a TTL of the message is greater than $A1\_min$, delivering the message to an upper-layer protocol for processing.

3. The method for realizing network security protection by TTL partition according to claim 1, wherein the step B further comprises:

setting an initial value for a TTL of a message sent by the device in the wholesale carrier network as 255.

4. The method for realizing network security protection by TTL partition according to claim 1, wherein the step B further comprises:

an provider edge (PE) router of the subordinate carrier network checking each message entering the subordinate carrier network; and when a PE router connected to the customer network receives a message not destined for the PE router connected to the customer network, if a TTL of the message is greater than $B1\_min$, decreasing the TTL of the message to $U1\_max$ and forwarding the message, and when a PE router connected to the wholesale carrier network receives a message not destined for the PE router connected to the wholesale carrier network, forwarding the message normally;

when a device in the subordinate carrier network receives a message destined for the device, if a TTL of the message is less than or equal to $B1\_min$, discarding the message; if a TTL of the message is greater than $B1\_min$, delivering the message to an upper layer-protocol for processing.

5. The method for realizing network security protection by TTL partition according to claim 4, wherein the step B further comprises:

setting an initial value for a TTL of a message sent by the device in the subordinate carrier network as 255.

6. A method for realizing network security protection by TTL (Time to Live) partition, comprising:

A) allocating different TTL segments to a wholesale carrier network, a subordinate carrier network and a customer network in CsC (Carrier's Carrier) networking;

B) realizing a TPSM (TTL Partition Security Mechanism) simultaneously in the wholesale carrier network and the subordinate carrier network using the allocated TTL segments; and wherein if the subordinate carrier network does not accept a message sent from a device in the wholesale carrier network, a range of a TTL allocated to the wholesale carrier network is $A2\_min \leq TTL \leq 255$, where $A2\_min$ is an allowable minimum for a TTL of the wholesale carrier network;

a range of a TTL allocated to the subordinate carrier network is $B2\_min \leq B2\_max$, where $B2\_max$ is an allowable maximum for a TTL of the subordinate carrier network, $B2\_min$ is an allowable minimum for a TTL of the subordinate carrier network, and $B2\_max$ is less than $A2\_min$;

a range of a TTL allocated to the customer network is $0<TTL<U2\_max$, where $U2\_max$ is an allowable maximum for a TTL of the customer network, and is less than $B2\_min$; and the step B comprises:

a provider edge (PE) router of the subordinate carrier network checking each message entering the subordinate carrier network; when a PE router connected to the customer network receives a message not destined for the PE router connected to the customer network, if a TTL of the message is greater than $B2\_min$, decreasing the TTL of the message to $U2\_max$ and forwarding the message; and when a PE router connected to the wholesale carrier network receives a message not destined for the PE router connected to the wholesale carrier network, if a TTL of the message is greater than $B2\_max$, discarding the message;

when a device in the subordinate carrier network receives a message destined for the device, if a TTL of the message is less than or equal to $B2\_min$, discarding the message; if a TTL of the message is greater than $B2\_min$, delivering the message to an upper-layer protocol for processing.

7. The method for realizing network security protection by TTL partition according to claim 6, wherein the step B further comprises:

a PE router of the wholesale carrier network checking each message entering the wholesale carrier network, and when the PE router of the wholesale carrier network receives a message not destined for the PE router of the wholesale carrier network, if a TTL of the message is greater than $A2\_min$, decreasing the TTL of the message to $B2\_max$ and forwarding the message;

when a device in the wholesale carrier network receives a message destined for the device, if a TTL of the message is not greater than $A2\_min$, discarding the message; if a TTL of the message is greater than $A2\_min$, delivering the message to an upper-layer protocol for processing.

8. The method for realizing network security protection by TTL partition according to claim 6, wherein the step B further comprises:

setting an initial value for a TTL of a message sent by the device of the wholesale carrier network as 255.

9. The method for realizing network security protection by TTL partition according to claim 6, wherein the step B further comprises:

setting an initial value for a TTL of a message sent by the device in the subordinate carrier network as $B2\_max$.

10. The method for realizing network security protection by TTL partition according to claim 6, wherein the method is applicable to an IPv4 or IPv6 network.

11. A system for realizing network security protection by TTL (Time to Live) partition, comprising:

a TTL segment allocating device, for allocating different TTL segments to a wholesale carrier network, a subordinate carrier network and a customer network in CsC (Carrier's Carrier) networking;

a security mechanism control device, connected with the TTL segment allocating device, for realizing a TPSM (TTL Partition Security Mechanism) simultaneously in the wholesale carrier network and the subordinate carrier network using the allocated TTL segments; and wherein if a message receiving strategy of the subordinate carrier network is that a message sent from a device in the wholesale carrier network is not accepted, the TTL segment allocating device allocates the TTL segments as following:

a range of a TTL allocated to the wholesale carrier network is $A2\_min \leq TTL \leq 255$, where $A2\_min$ is an allowable minimum for a TTL of the wholesale carrier network;

a range of a TTL allocated to the subordinate carrier network is $B2\_min \leq TTL \leq B2\_max$, where $B2\_max$ is an allowable maximum for a TTL of the subordinate carrier network, $B2\_min$ is an allowable minimum for a TTL of the subordinate carrier network, and $B2\_max$ is less than $A2\_min$;

a range of a TTL allocated to the customer network is $0 < TTL \leq U2\_max$, where $U2\_max$ is an allowable maximum for a TTL of the customer network, and is less than $B2\_min$;

and the realizing the TPSM comprises:

a provider edge (PE) router of the subordinate carrier network checking each message entering the subordinate carrier network; and when a PE router connected to the customer network receives a message not destined for the PE router connected to the customer network, if a TTL of the message is greater than $B2\_min$, decreasing the TTL of the message to $U2\_max$ and forwarding the message, and when a PE router connected to the wholesale carrier network receives a message not destined for the PE router connected to the wholesale carrier network, if a TTL of the message is greater than $B2\_max$, discarding the message;

when a device in the subordinate carrier network receives a message destined for the device, if a TTL of the message is less than or equal to $B2\_min$, discarding the message; if a TTL of the message is greater than $B2\_min$, delivering the message to an upper-layer protocol for processing.

12. The system for realizing network security protection by TTL partition according to claim 11, wherein the system further comprises:

a network strategy setting device, connected with the TTL segment allocating device, for setting the message receiving strategy of the subordinate carrier network.

13. The system for realizing network security protection by TTL partition according to claim 12, wherein:

if the message receiving strategy of the subordinate carrier network set by the network strategy setting device is that a message sent from a device in the wholesale carrier network is received, the TTL segment allocating device allocates the TTL segments as following:

a range of a TTL allocated to the wholesale carrier network is $A1\_min \leq TTL 255$, where $A1\_min$ is an allowable minimum for a TTL of the wholesale carrier network;

a range of a TTL allocated to the subordinate carrier network is $B1\_min \leq TTL \leq 255$, where $B1\_min$ is an allowable minimum for a TTL of the subordinate carrier network, and is less than $A1\_min$;

a range of a TTL allocated to the customer network is $0 < TTL \leq U1\_max$, where $U1\_max$ is an allowable maximum for a TTL of the customer network, and is less than $B1\_min$.

14. The system for realizing network security protection by TTL partition according to claim 11, wherein the security mechanism control device comprises:

a control module of a wholesale carrier network message, located in a PE router of the wholesale carrier network, for controlling, in accordance with the TTL segment allocated by the TTL segment allocating device to the wholesale carrier network, the edge router to forward a received message;

a control module of a subordinate carrier network message, located in the PE router of the subordinate carrier network, for controlling, in accordance with the TTL segment allocated by the TTL segment allocating device to the subordinate carrier network, the PE router of the subordinate carrier network to forward a received message.

15. The method for realizing network security protection by TTL partition according to claim 6, wherein if the subordinate carrier network accepts a message sent from a device in the wholesale carrier network, the step A comprises:

a range of a TTL allocated to the wholesale carrier network is $A1\_min \leq 255$, where $A1\_min$ is an allowable minimum for a TTL of the wholesale carrier network;

a range of a TTL allocated to the subordinate carrier network is $B1\_min \leq TTL \leq 255$, where $B1\_min$ is an allowable minimum for a TTL of the subordinate carrier network, and is less than $A1\_min$; and a range of a TTL allocated to the customer network is $0 < TTL \leq U1\_max$, where $U1\_max$ is an allowable maximum for a TTL of the customer network, and is less than $B1\_min$.

16. The method for realizing network security protection by TTL partition according to claim 15, wherein the step B comprises:

a PE router of the wholesale carrier network checking each message entering the wholesale carrier network, and when the PE router of the wholesale carrier network receives a message not destined for the PE router of the wholesale carrier network, if a TTL of the message is greater than $A1\_min$, decreasing the TTL of the message to $B1\_max$ and forwarding the message;

when a device in the wholesale carrier network receives a message destined for the device, if a TTL of the message is less than or equal to $A1\_min$, discarding the message; if a TTL of the message is greater than $A1\_min$, delivering the message to an upper-layer protocol for processing.

17. The method for realizing network security protection by TTL partition according to claim 15, wherein the step B comprises:

the PE router of the subordinate carrier network checking each message entering the subordinate carrier network; and when the PE router connected to the customer network receives a message not destined for the PE router connected to the customer network, if a TTL of the message is greater than $B1\_min$, decreasing the TTL of the message to $U1\_max$ and forwarding the message, and when the PE router connected to the wholesale carrier network receives a message not destined for the PE router connected to the wholesale carrier network, forwarding the message normally;

when a device in the subordinate carrier network receives a message destined for the device, if a TTL of the message is less than or equal to $B1\_min$, discarding the message; if a TTL of the message is greater than $B1\_min$, delivering the message to an upper layer-protocol for processing.

18. The system for realizing network security protection by TTL partition according to claim 11, wherein the realizing the TPSM comprises:

a PE router of the wholesale carrier network checking each message entering the wholesale carrier network, and when the PE router of the wholesale carrier network receives a message not destined for the PE router of the wholesale carrier network, if a TTL of the message is greater than A2_min, decreasing the TTL of the message to B2_max and forwarding the message;

when a device in the wholesale carrier network receives a message destined for the device, if a TTL of the message is not greater than A2_min, discarding the message; if a TTL of the message is greater than A2_min, delivering the message to an upper-layer protocol for processing.

19. The system for realizing network security protection by TTL partition according to claim 13, wherein the realizing the TPSM comprises:

a PE router of the wholesale carrier network checking each message entering the wholesale carrier network, and when the PE router of the wholesale carrier network receives a message not destined for the PE router of the wholesale carrier network, if a TTL of the message is greater than A1_min, decreasing the TTL of the message to B1_max and forwarding the message;

when a device in the wholesale carrier network receives a message destined for the device, if a TTL of the message is less than or equal to A1_min, discarding the message; if a TTL of the message is greater than A1_min, delivering the message to an upper-layer protocol for processing.

20. The system for realizing network security protection by TTL partition according to claim 13, wherein the realizing the TPSM comprises:

the PE router of the subordinate carrier network checking each message entering the subordinate carrier network; and when the PE router connected to the customer network receives a message not destined for the PE router connected to the customer network, if a TTL of the message is greater than B1_min, decreasing the TTL of the message to U1_max and forwarding the message, and when the PE router connected to the wholesale carrier network receives a message not destined for the PE router connected to the wholesale carrier network, forwarding the message normally;

when a device in the subordinate carrier network receives a message destined for the device, if a TTL of the message is less than or equal to B1_min, discarding the message; if a TTL of the message is greater than B1_min, delivering the message to an upper layer-protocol for processing.

* * * * *